United States Patent
Cadima

(10) Patent No.: US 9,631,817 B2
(45) Date of Patent: Apr. 25, 2017

(54) COOKTOP APPLIANCE

(71) Applicant: General Electric Company, Schenectady, NY (US)

(72) Inventor: Paul Bryan Cadima, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 14/805,810

(22) Filed: Jul. 22, 2015

(65) Prior Publication Data

US 2017/0023254 A1   Jan. 26, 2017

(51) Int. Cl.

| | |
|---|---|
| *A47J 37/07* | (2006.01) |
| *F24C 3/00* | (2006.01) |
| *F24C 15/10* | (2006.01) |
| *A47J 37/00* | (2006.01) |
| *F24B 3/00* | (2006.01) |
| *F24C 1/06* | (2006.01) |
| *A47J 37/06* | (2006.01) |
| *F24C 3/08* | (2006.01) |
| *F24C 3/12* | (2006.01) |

(52) U.S. Cl.
CPC ............ *F24C 1/06* (2013.01); *A47J 37/0676* (2013.01); *F24C 3/082* (2013.01); *A47J 37/0611* (2013.01); *A47J 37/0704* (2013.01); *F24C 3/12* (2013.01)

(58) Field of Classification Search
CPC .. A47J 37/067; A47J 37/0676; A47J 37/0682; A47J 37/0611; A47J 37/0704; A47J 36/06; A47J 2201/00; F24C 15/102; F24C 15/10; F24C 3/085; F24C 3/12; F24C 3/10; F24C 1/06; F24C 7/067; F24C 11/00; F24C 15/108; H05B 3/681; H05B 3/748; H05B 6/666; F24B 13/00; F23D 14/72; F23D 2209/00; F23Q 3/00
USPC ... 219/450.1, 451.1, 452.11, 452.12, 452.13, 219/453.11, 453.12, 453.13, 453.14, 219/460.1, 524, 262; 99/339, 340, 422, 99/324, 484; 126/39 E, 211, 217, 218, 126/214 C, 42, 39 H–39 K, 90 R, 1 R, 27, 126/25 B, 9 B, 39 BA, 166
See application file for complete search history.

(56) References Cited

U.S. PATENT DOCUMENTS

| 2,422,950 A | * | 6/1947 | Cash ...................... F24C 7/00 |
| | | | 126/37 A |
| 3,632,982 A | * | 1/1972 | Linger ................... H05B 3/68 |
| | | | 219/448.17 |
| 3,797,375 A | * | 3/1974 | Cerola ............... F24C 15/2042 |
| | | | 219/449.1 |
| 4,042,806 A | * | 8/1977 | McCartney ......... A47J 37/0676 |
| | | | 126/21 A |

(Continued)

*Primary Examiner* — Quang D Thanh
*Assistant Examiner* — Hemant Mathew
(74) *Attorney, Agent, or Firm* — Dority & Manning, P.A.

(57) ABSTRACT

A cooktop appliance includes a plurality of gas burners positioned at an outer surface of a panel. A griddle plate may be positioned over at least one gas burner of the plurality of gas burners. An electric heating element is mounted to the griddle plate. A socket on the panel may receive a plug of the electric heating element. A switch configured for obstructing gas fuel flow to the at least one gas burner of the plurality of gas burners when the griddle plate is positioned over the at least one gas burner of the plurality of gas burners.

17 Claims, 5 Drawing Sheets

(56) References Cited

U.S. PATENT DOCUMENTS

| | | | | |
|---|---|---|---|---|
| 6,903,309 | B2 * | 6/2005 | Rhinehart | F24C 15/101 219/451.1 |
| D613,117 | S * | 4/2010 | Richburg | D7/409 |
| 8,033,279 | B2 * | 10/2011 | Shaffer | F24C 3/126 126/1 R |
| 2009/0126715 | A1 * | 5/2009 | Grassi | F24C 15/10 126/39 R |
| 2012/0111312 | A1 * | 5/2012 | Kim | F24C 15/18 126/214 C |
| 2014/0261009 | A1 * | 9/2014 | Bringe | A47J 37/067 99/340 |

* cited by examiner

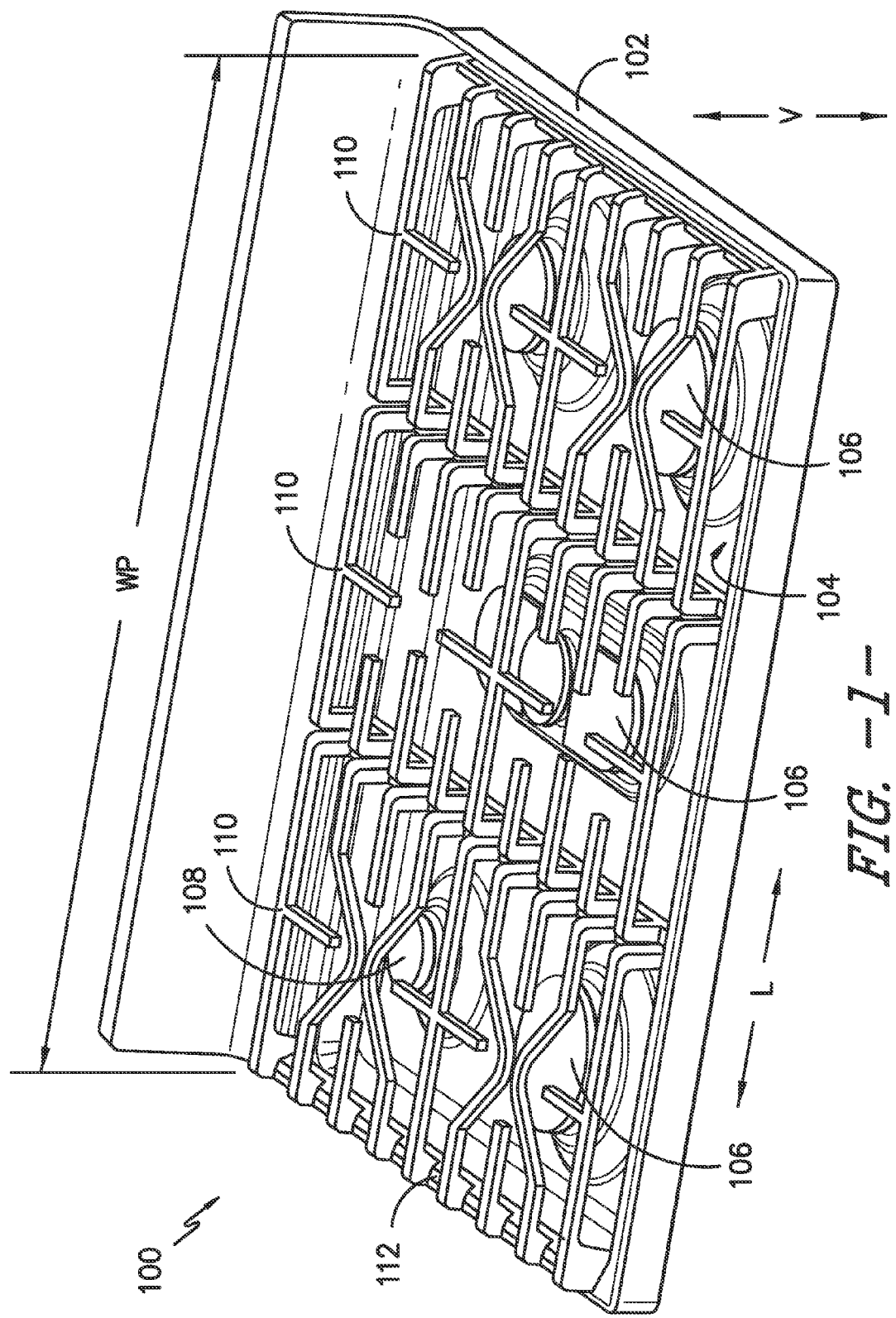

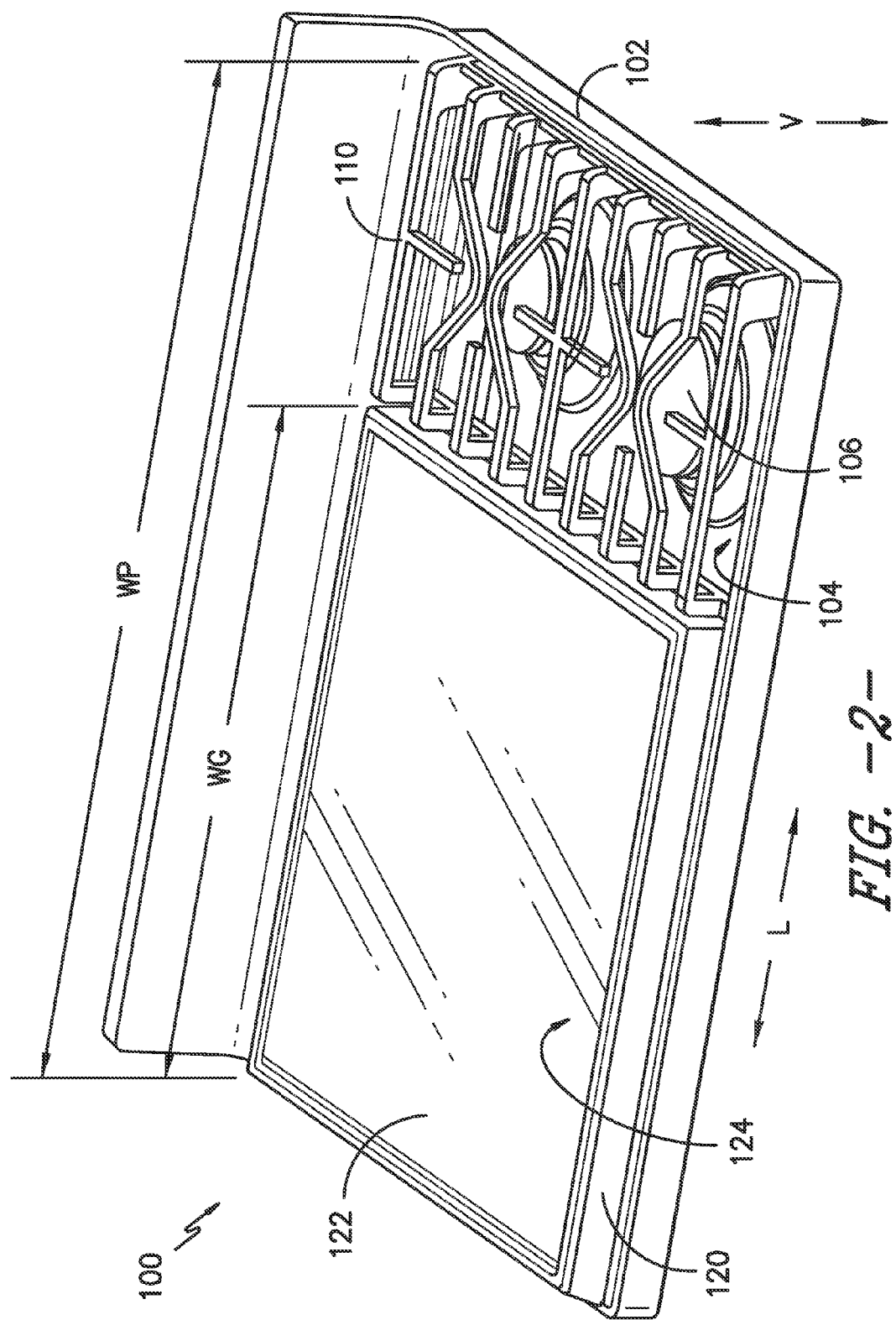
FIG. -2-

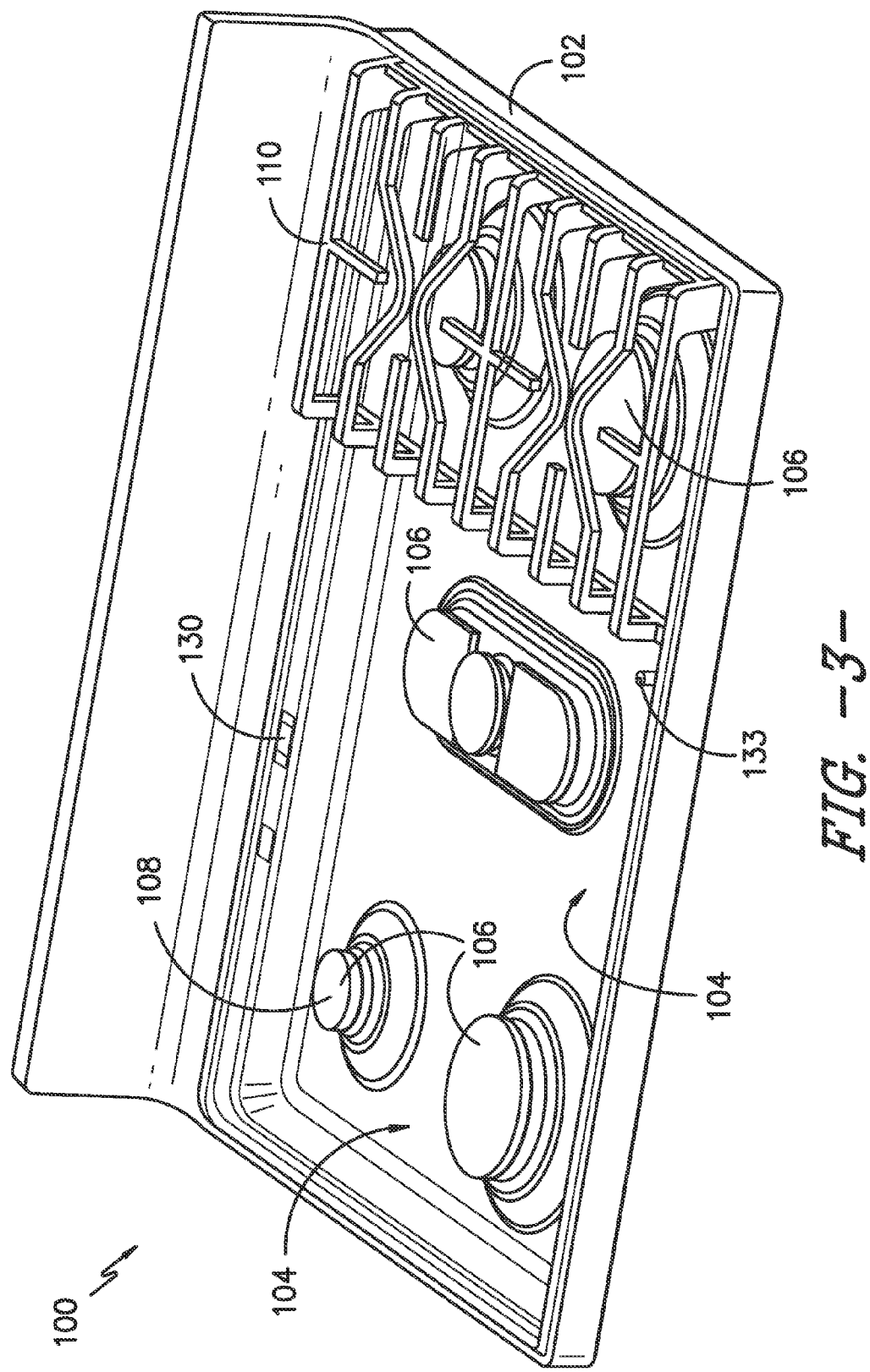
FIG. -3-

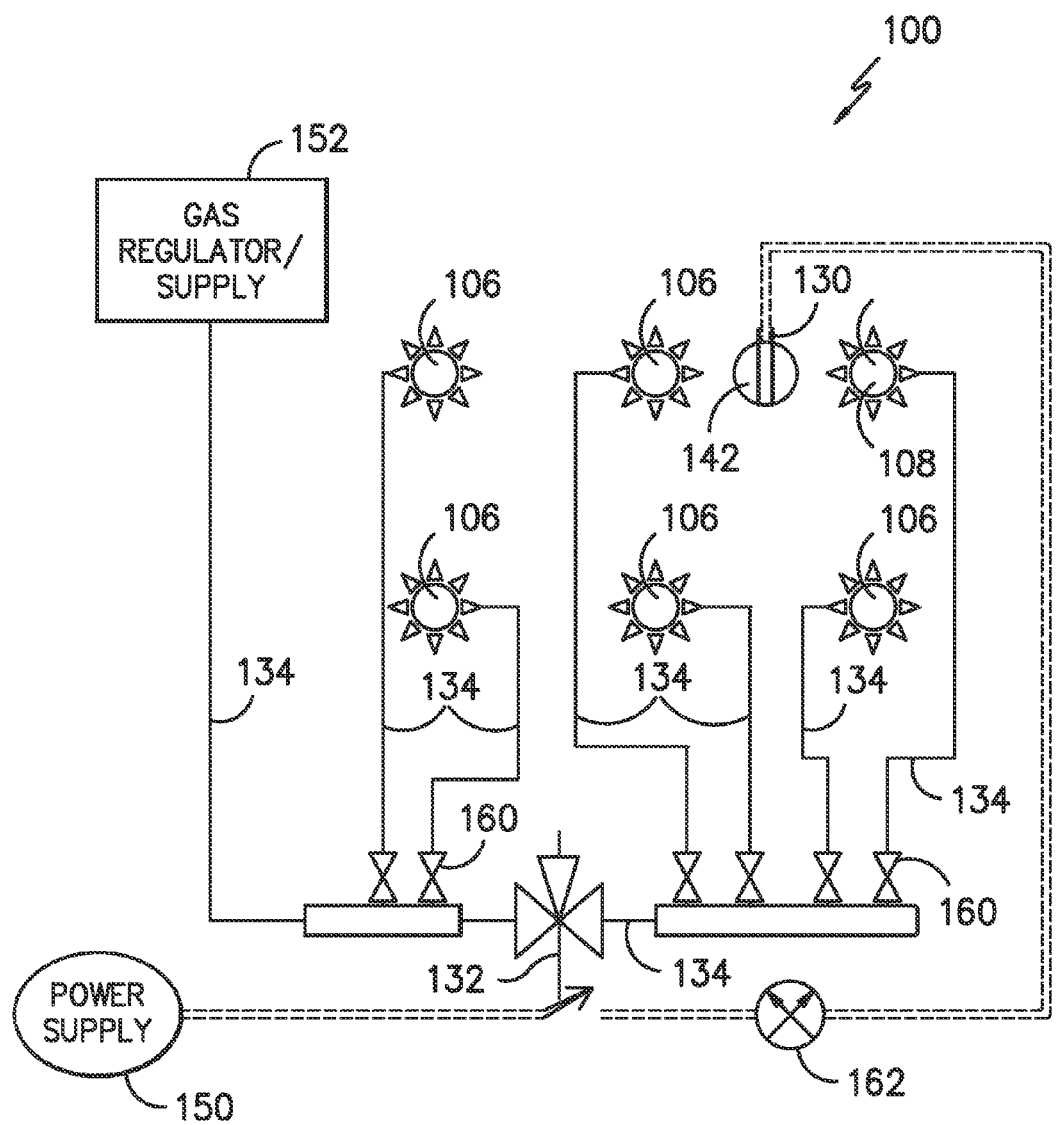
FIG. -4-

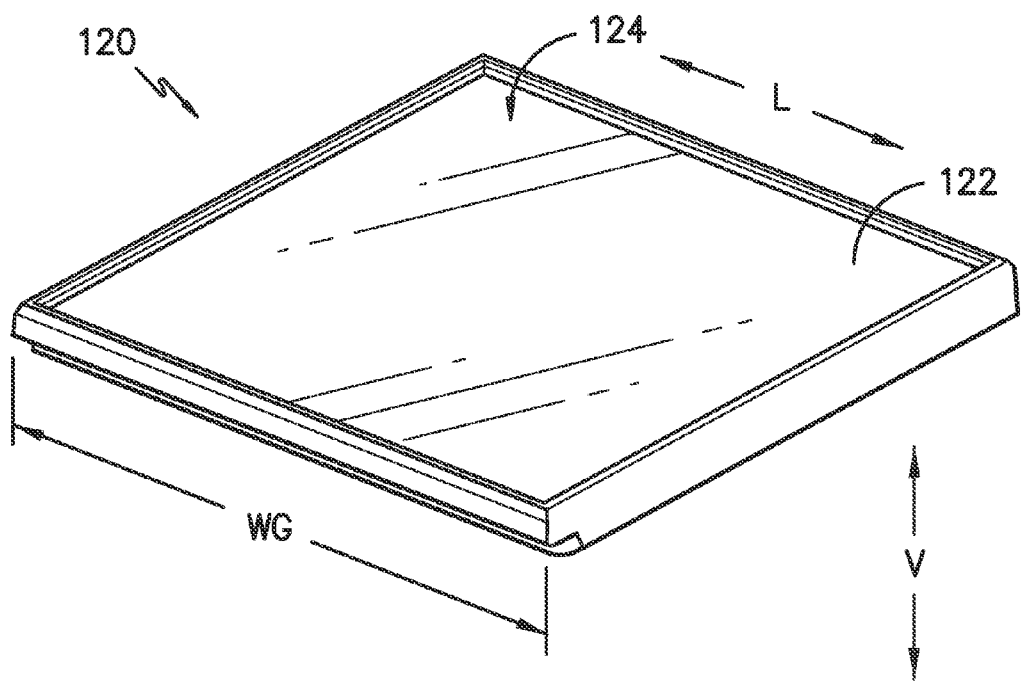
FIG. -5-
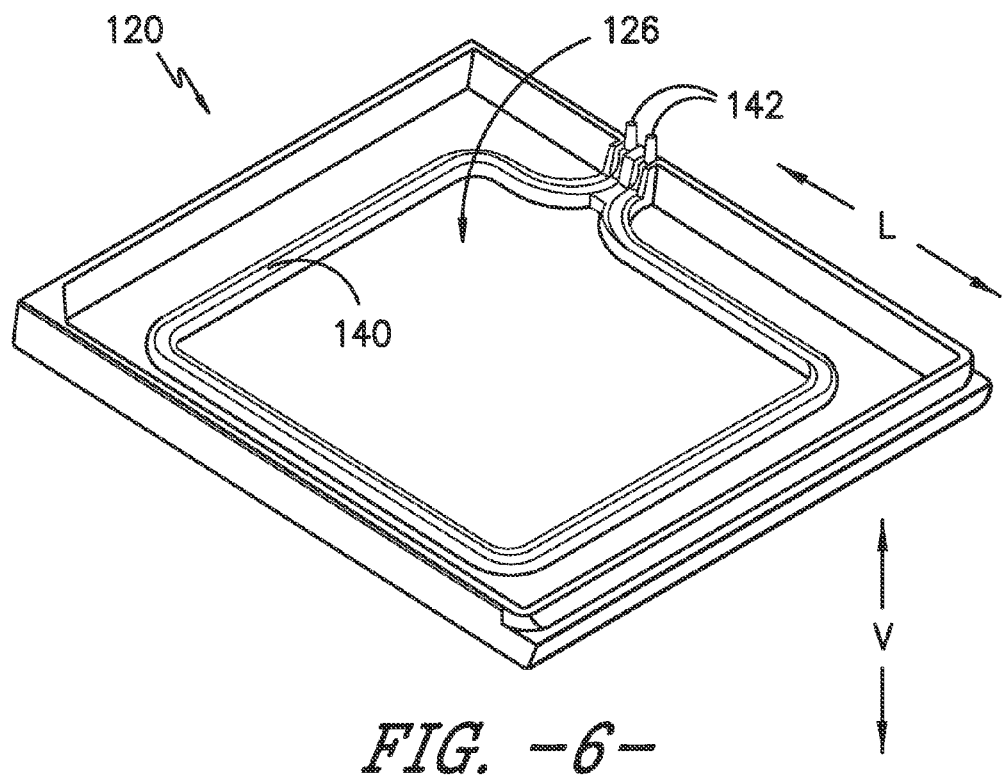
FIG. -6-

COOKTOP APPLIANCE

FIELD OF THE INVENTION

The present subjection matter relates generally to cooktop appliances, such as cooktop appliances with gas burners.

BACKGROUND OF THE INVENTION

Range appliances generally include a cooktop portion and an oven portion. The cooktop portion of certain range appliances includes gas burners for heating cookware, such as griddles. Recently, gas cooktop appliances with integrated griddles have become popular. Integrated griddles on gas cooktop appliances are positioned over a gas burner and are heated by combustion of gaseous fuel and air at the gas burner.

Providing an integrated griddle can have drawbacks. For example, certain gas cooktop appliances with integrated griddles include an elongated burner for more evenly heating the integrated griddle. However, elongated burners can provide limited utility outside of heating griddles, and consumers generally only use griddles occasionally. As another example, a size of integrated griddles may be limited due to the need to center the integrated griddle over the gas burners. Integrated griddles can also block a significant portion of airflow to the gas burner as well as exhaust from the gas burner, which leads to poor combustion and excessive heating of cooktop components.

Accordingly, a gas cooktop appliance with features for evenly heating a griddle would be useful. In particular, a gas cooktop appliance with features for evenly heating a large griddle would be useful.

BRIEF DESCRIPTION OF THE INVENTION

The present subject matter provides a cooktop appliance. The cooktop appliance includes a plurality of gas burners positioned at an outer surface of a panel. A griddle plate may be positioned over at least one gas burner of the plurality of gas burners. An electric heating element is mounted to the griddle plate. A socket on the panel may receive a plug of the electric heating element. A switch configured for obstructing gas fuel flow to the at least one gas burner of the plurality of gas burners when the griddle plate is positioned over the at least one gas burner of the plurality of gas burners. Additional aspects and advantages of the invention will be set forth in part in the following description, or may be apparent from the description, or may be learned through practice of the invention.

In a first exemplary embodiment, a cooktop appliance is provided. The cooktop appliance includes a panel having an outer surface. A plurality of gas burners is positioned at the outer surface of the panel. A griddle plate is positioned over at least one gas burner of the plurality of gas burners. The griddle plate has a bottom surface that faces the outer surface of the panel. An electric heating element is mounted to the griddle plate. The electric heating element has a plug. A socket is mounted to the panel. The socket receives the plug of the electric heating element. A gas conduit extends to the at least one gas burner of the plurality of gas burners. A switch is coupled to the gas conduit. The switch is configured for obstructing gas fuel flow to the at least one gas burner of the plurality of gas burners when the griddle plate is positioned over the at least one gas burner of the plurality of gas burners.

In a second exemplary embodiment, a cooktop appliance is provided. The cooktop appliance includes a panel having an outer surface. A plurality of gas burners is positioned at the outer surface of the panel. A plurality of grates has a first grate. The first grate is configured to be positioned on the panel over a first gas burner of the plurality of gas burners in a gas burner cooking configuration. A griddle assembly is configured to be positioned on the panel over the first gas burner of the plurality of gas burners in a griddle cooking configuration. The griddle assembly includes a griddle plate and an electric heating element mounted to griddle plate. The electric heating element includes a plug. A socket is mounted to the panel. The socket is configured for receiving the plug of the electric heating element in the griddle cooking configuration. A gas conduit extends to the first gas burner. A switch is coupled to the gas conduit. The switch is configured for obstructing gas fuel flow to the first gas burner in the griddle cooking configuration.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIGS. 1, 2 and 3 provide perspective views of a cooktop appliance according to an exemplary embodiment of the present subject matter with the exemplary cooktop appliance shown in various configurations.

FIG. 4 provides a schematic view of certain components of the exemplary cooktop appliance of FIG. 1.

FIGS. 5 and 6 provide perspective views of a griddle assembly of the exemplary cooktop appliance of FIG. 2.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIGS. 1, 2 and 3 provide perspective views of a cooktop appliance 100 according to an exemplary embodiment of the present subject matter with cooktop appliance 100 shown in various configurations. In FIG. 1, cooktop appliance 100 is shown in a gas burner cooking configuration, and cooktop appliance 100 is shown in a griddle cooking configuration in FIG. 2. Cooktop appliance 100 is shown without a first grate 112 (FIG. 1) or a griddle assembly 120 (FIG. 2) positioned on a top panel 102 of the cooktop appliance 100 in FIG. 3. A user may selectively adjust cooktop appliance 100 between the gas burner cooking configuration of FIG. 1 and the griddle cooking configuration in FIG. 2, as discussed in greater detail below.

Cooktop appliance 100 may be installed at any suitable location. For example, cooktop appliance 100 may be mounted to a countertop and used as a standalone cooktop appliance in certain exemplary embodiments. In other exemplary embodiments, cooktop appliance 100 may be utilized in a range appliance. In addition, while described in greater detail below in the context of cooktop appliance 100, it should be understood that the present subject matter may be used in any other suitable cooktop appliance in alternative exemplary embodiments. Thus, cooktop appliance 100 is provided by way of example only and is not intended to limit the present subject matter to any particular gas burner arrangement.

As may be seen in FIGS. 1-3, cooktop appliance 100 includes top panel 102 with an outer surface 104. Top panel 102 may be constructed of or with any suitable material. For example, top panel 102 may be constructed of or with enameled steel or ceramic. Top panel 102 may also have any suitable shape. For example, top panel 102 may be rectangular or square, e.g., in a plane that is perpendicular to a vertical direction V.

A plurality of gas burners 106 is mounted to top panel 102 and is positioned at outer surface 104 of top panel 102. Each gas burner of gas burners 106 may have any suitable shape and size, and a combination of variously sized and/or shaped gas burners 106 may be provided in order to facilitate heating of a variety of cooking utensils. For example, as shown in FIG. 1, one of gas burners 106 may be an elongated gas burner suitable of heating fish poachers and other elongated cookware. The elongated gas burner may be positioned at a central portion of top panel 102, e.g., between respective pairs of round gas burners.

A plurality of grates 110 is also positioned on top panel 102 at outer surface 104 of top panel 102 over gas burners 106. Grates 110 are configured for supporting cooking utensils, such as pots, pans, etc., over gas burners 106, and gas burners 106 are configured for combusting gaseous fuel and air in order to heat cooking utensils on grates 110. As shown in FIG. 1, grates 110 include a first grate 112 (or pair of grates). First grate 112 is configured to be positioned on top panel 102 over a first gas burner 108 of gas burners 106 in the gas burner cooking configuration. Grates 110, including first grate 112, are removable from top panel 102. For example, a user of cooktop appliance 100 may lift grates 110 upwardly to remove grates 110 from top panel 102.

Turning to FIG. 2, cooktop appliance 100 also includes a griddle assembly 120. Griddle assembly 120 is configured to be positioned on top panel 102 over first gas burner 108 of gas burners 106 in the griddle cooking configuration. Thus, like first grate 112, griddle assembly 120 is removable from top panel 102. In particular, first grate 112 and griddle assembly 120 may be interchangeable on top panel 102. Thus, a user may shift cooktop appliance 100 from the gas burner cooking configuration shown in FIG. 1 to the griddle cooking configuration shown in FIG. 2 by removing first grate 112 from top panel 102 and placing griddle assembly 120 on top panel 102 over first gas burner 108 of gas burners 106.

Griddle assembly 120 may be positioned over any suitable number of gas burners 106 when cooktop appliance 100 is in the griddle cooking configuration. For example, as discussed above, griddle assembly 120 is positioned over first gas burner 108 of gas burners 106 in the griddle cooking configuration. Thus, griddle assembly 120 is positioned over at least one gas burner in the griddle cooking configuration. In alternative exemplary embodiments, griddle assembly 120 may be positioned over at least two gas burners, at least three gas burners, at least four gas burners, etc. in the griddle cooking configuration. As shown in FIG. 2, griddle assembly 120 is not positioned over all gas burners of gas burners 106 when cooktop appliance 100 is in the griddle cooking configuration, in certain exemplary embodiments. Thus, some of gas burners 106 may be accessible and operable when cooktop appliance 100 is in the griddle cooking configuration.

As may be seen in FIG. 2, griddle assembly 120 includes a griddle plate 122 with a cooking surface 124. Cooking surface 124 is configured for supporting food items thereon during cooking of such food items with griddle assembly 120. Griddle plate 122 may have any suitable shape. For example, griddle plate 122 may be rectangular or square, e.g., in a plane that is perpendicular to the vertical direction V.

Griddle plate 122 may also have any suitable size relative to top panel 102. For example, outer surface 104 of top panel 102 may define an area, e.g., in a plane that is perpendicular to the vertical direction V. Cooking surface 124 of griddle plate 122 may also define an area, e.g., in a plane that is perpendicular to the vertical direction V. The area of cooking surface 124 of griddle plate 122 may be sized between fifty percent and one-hundred percent of the area of outer surface 104 of top panel 102. In particular, the area of cooking surface 124 of griddle plate 122 may be sized about sixty percent of the area of outer surface 104 of top panel 102. As another example, griddle plate 122 defines a width WG along a lateral direction L that is perpendicular to the vertical direction V, and top panel 102 also defines a width WP along the lateral direction L. The width WG of griddle plate 122 may be no less than half the width WP of top panel 102. Such sizing of griddle plate 122 relative to top panel 102 may assist with providing a large cooking surface 124 for food items when cooktop appliance 100 is in the griddle cooking configuration, e.g., while also allowing operation of at least one of gas burners 106.

FIG. 4 provides a schematic view of certain components of cooktop appliance 100. As may be seen in FIG. 4, cooktop appliance 100 includes a receptacle or socket 130 and a cutoff or switch 132. Socket 130 may be mounted to top panel 102, e.g., below outer surface 104 of top panel 102. Socket 130 is configured for receiving a plug 142 of an electric heating element 140 in the griddle cooking configuration. Thus, plug 142 of electric heating element 140 is received within socket 130 when cooktop appliance 100 is in the griddle cooking configuration. Conversely, plug 142 of electric heating element 140 is removed from socket 130 when cooktop appliance 100 is in the gas burner cooking configuration. Socket 130 provides an electrical connection between electric heating element 140 and a power supply 150, such as a household electrical supply. Thus, power supply 150, e.g., via socket 130, may provide a voltage drop across plug 142 of electric heating element 140 in order to power electric heating element 140. Cooktop appliance 100 also includes a temperature control 162, such as a knob, button or switch, for allowing a user to select and control a heat output of electric heating element 140.

Like socket 130, switch 132 may be mounted to top panel 102, e.g., below outer surface 104 of top panel 102. Switch 132 is coupled to a gas conduit 134. Gas conduit 134 extends to at least first gas burner 108 of gas burners 106 and is configured for supplying gaseous fuel, such as natural gas or propane, from a fuel supply 152 to first gas burner 108 of gas burners 106. Control valves 160 are also coupled to gas conduit 134. Each control valve of control valves 160 permits a user of cooktop appliance 100 to regulate a flow of gaseous fuel to a respective gas burner or combination of gas burners of gas burners 106.

As discussed above, switch 132 is coupled to gas conduit 134 and is configured for selectively obstructing gas fuel flow through gas conduit 134 to the first gas burner 108 or any suitable combination of gas burners 106 over which griddle assembly 120 is positioned. In particular, switch 132 is configured for obstructing gas fuel flow through gas conduit 134 to the first gas burner 108 when cooktop appliance 100 is in the griddle cooking configuration and for permitting gas fuel flow through gas conduit 134 to the first gas burner 108 when cooktop appliance 100 is in the gas burner cooking configuration. In such a manner, switch 132 may limit or prevent collection of gaseous fuel from first gas burner 108 below griddle assembly 120 when cooktop appliance 100 is in the griddle cooking configuration.

Turning back to FIG. 3, switch 132 may include a plunger switch 133 that extends through top panel 102. Griddle assembly 120 contacts plunger switch 133 when cooktop appliance 100 is in the griddle cooking configuration such that plunger switch 133 is depressed and obstructs gas fuel flow to first gas burner 108. Switch 132 may also be configured for interrupting power to an igniter of first gas burner 108, such as a spark electrode, in the griddle cooking configuration. In such a manner, switch 132 may prohibit operation of the igniter of first gas burner 108 in the griddle cooking configuration. Switch 132 may also be configured for interrupting the electrical connection between electric heating element 140 and power supply 150 in the griddle cooking configuration.

FIGS. 5 and 6 provide perspective views of griddle assembly 120. As may be seen in FIG. 6, griddle plate 122 has a bottom surface 126 that is positioned opposite cooking surface 124 of griddle plate 122 and faces outer surface 104 of top panel 102 when cooktop appliance 100 is in the griddle cooking configuration. Griddle plate 122 may be constructed of or with any suitable material. For example, griddle plate 122 may be constructed of or with cast iron, steel or aluminum.

As may be seen in FIG. 6, electric heating element 140 is mounted to griddle plate 122. As an example, electric heating element 140 may be fastened, adhered, strapped, etc. to griddle plate 122 at bottom surface 126 of griddle plate 122. Electric heating element 140 may be any suitable type of electric heating element. For example, electric heating element 140 may include an electric resistance heating element, such as a calrod loop or coil, a halogen heating element, etc.

As may be seen in FIGS. 1-5, the present subject matter provides electrically heated griddle assembly 120 that a user may place onto cooktop appliance 100 over gas burners 106 in place of at least one of grates 110. Electrical heating element 140 is coupled to griddle plate 122 and plugs into socket 130 on top panel 102. Switch 132 is engaged (or alternatively disengaged) when griddle assembly 120 is placed onto top panel 102 such that switch 132 shuts off gas flow to burners of gas burners 106 positioned beneath griddle assembly 120 and disconnects power to the burners' ignition modules in order to prevent any operation of burners of gas burners 106 positioned beneath griddle assembly 120 when griddle assembly 120 is in place.

Because griddle assembly 120 is electrically heated, heating of griddle plate 122 may be more efficient relative to heating griddle plate 122 with gas burners 106. In addition, heating of griddle assembly 120 does not give rise to concerns regarding poor combustion below griddle assembly 120 or excessive heating of top panel 102 by gas burners 106 when griddle assembly 120 is in place. In addition, griddle plate 122 may be larger than comparable gas heated griddle plates, e.g., at least twice as large.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance, comprising:
   a panel having an outer surface;
   a plurality of gas burners positioned at the outer surface of the panel;
   a griddle plate positioned over at least one gas burner of the plurality of gas burners, the griddle plate having a bottom surface that faces the outer surface of the panel;
   an electric heating element mounted to the griddle plate, the electric heating element having a plug;
   a socket mounted to the panel, the socket receiving the plug of the electric heating element;
   a gas conduit extending to the at least one gas burner of the plurality of gas burners; and
   a switch coupled to the gas conduit, the switch configured for obstructing gas fuel flow to the at least one gas burner of the plurality of gas burners when the griddle plate is positioned over the at least one gas burner of the plurality of gas burners;
   wherein the switch is also configured for interrupting power to an igniter of the at least one gas burner of the plurality of gas burners and the socket when the griddle plate is positioned over the at least one gas burner of the plurality of gas burners.

2. The cooktop appliance of claim 1, further comprising a grate, the grate configured to be positioned on the panel at the at least one gas burner of the plurality of gas burners when the griddle plate is removed from the panel.

3. The cooktop appliance of claim 1, wherein the switch comprises a plunger switch extending through the panel, the griddle plate contacting the plunger switch such that the plunger switch obstructs the gas fuel flow to the at least one gas burner of the plurality of gas burners when the griddle plate is positioned over the at least one gas burner of the plurality of gas burners.

4. The cooktop appliance of claim 1, wherein the griddle plate comprises cast iron, steel or aluminum.

5. The cooktop appliance of claim 1, wherein the griddle plate defines a width along a lateral direction, the panel also defining a width along the lateral direction, the width of the griddle plate being no less than half the width of the panel.

6. The cooktop appliance of claim 1, wherein the griddle plate has a cooking surface positioned opposite the bottom surface of the griddle plate, the outer surface of the panel defining an area in a plane that is perpendicular to a vertical direction, the cooking surface of the griddle plate also defining an area in a plane that is perpendicular to the vertical direction, the area of the cooking surface of the griddle plate sized between fifty percent and one-hundred percent of the area of the outer surface of the panel.

7. The cooktop appliance of claim 6, wherein the outer surface of the panel and the cooking surface of the griddle plate each have a rectangular or square shape.

8. The cooktop appliance of claim 1, wherein the griddle plate is positioned over at least three of the as burners of the plurality of gas burners.

9. The cooktop appliance of claim 8, wherein the griddle plate is not positioned over all of the gas burners of the plurality of gas burners.

10. A cooktop appliance, comprising:
a panel having an outer surface;
a plurality of gas burners positioned at the outer surface of the panel;
a plurality of grates having a first grate, the first grate configured to be positioned on the panel over a first gas burner of the plurality of gas burners in a gas burner cooking configuration;
a griddle assembly configured to be positioned on the panel over the first gas burner of the plurality of gas burners in a griddle cooking configuration, the griddle assembly including a griddle plate and an electric heating element mounted to the griddle plate, the electric heating element including a plug;
a socket mounted to the panel, the socket configured for receiving the plug of the electric heating element in the griddle cooking configuration; and
a gas conduit extending to the first gas burner; and
a switch coupled to the gas conduit, the switch configured for obstructing gas fuel flow to the first gas burner in the griddle cooking configuration;
wherein the switch comprises a plunger switch extending through the panel, the griddle plate contacting the plunger switch such that the plunger switch obstructs the gas fuel flow to the first gas burner in the griddle cooking configuration.

11. The cooktop appliance of claim 10, wherein the switch is also configured for interrupting power to an igniter of the first gas burner and the socket in the griddle cooking configuration.

12. The cooktop appliance of claim 10, wherein the griddle plate comprises cast iron steel or aluminum.

13. The cooktop appliance of claim 10, wherein the griddle plate defines a width along a lateral direction, the panel also defining a width along the lateral direction, the width of the griddle plate being no less than half the width of the panel.

14. The cooktop appliance of claim 10, wherein the griddle plate has a cooking surface, the outer surface of the panel defining an area in a plane that is perpendicular to a vertical direction, the cooking surface of the griddle plate also defining an area in a plane that is perpendicular to the vertical direction, the area of the cooking surface of the griddle plate sized between fifty percent and one-hundred percent of the area of the outer surface of the panel.

15. The cooktop appliance of claim 14, wherein the outer surface of the panel and the cooking surface of the griddle plate each have a rectangular or square shape.

16. The cooktop appliance of claim 10, wherein the griddle plate is positioned over at least three of the gas burners of the plurality of gas burners in the griddle cooking configuration.

17. The cooktop appliance of claim 16, wherein the griddle plate is not positioned over all of the gas burners of the plurality of gas burners in the griddle cooking configuration.

* * * * *